(12) United States Patent
Stewart

(10) Patent No.: US 7,117,520 B2
(45) Date of Patent: Oct. 3, 2006

(54) SYSTEM AND METHOD FOR VOICE/DATA TRANSMISSION OVER CABLE NETWORKS

(75) Inventor: John Sidney Stewart, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 197 days.

(21) Appl. No.: 10/372,618

(22) Filed: Feb. 24, 2003

(65) Prior Publication Data
US 2004/0168192 A1     Aug. 26, 2004

(51) Int. Cl.
*H04N 7/173*     (2006.01)
(52) U.S. Cl. .................. 725/106; 725/62; 725/127; 725/149; 725/81; 455/7; 455/557
(58) Field of Classification Search ............... 725/62, 725/106, 127, 128, 129, 148, 149, 81, 85; 455/14, 20, 402, 462, 7, 557
See application file for complete search history.

(56) References Cited

U.S. PATENT DOCUMENTS

| 5,574,966 | A | * | 11/1996 | Barzegar et al. ............... 725/62 |
|---|---|---|---|---|
| 5,987,303 | A | * | 11/1999 | Dutta et al. .................. 725/106 |
| 6,032,057 | A | * | 2/2000 | Kiiski ........................ 455/446 |
| 6,088,569 | A | | 7/2000 | Bach et al. |
| 6,396,531 | B1 | | 5/2002 | Gerszberg et al. |
| 6,400,957 | B1 | | 6/2002 | Rodrigues et al. |
| 6,513,163 | B1 | | 1/2003 | Silvia et al. ................. 725/106 |
| 6,751,441 | B1 | * | 6/2004 | Murray et al. .................. 455/7 |
| 2003/0005459 | A1 | | 1/2003 | Sawada ....................... 725/109 |
| 2003/0188319 | A1 | * | 10/2003 | Weissman .................... 725/106 |
| 2004/0187156 | A1 | * | 9/2004 | Palm et al. .................... 725/81 |
| 2005/0144647 | A1 | * | 6/2005 | Zussman et al. ............ 725/106 |

FOREIGN PATENT DOCUMENTS

WO     WO 00/05895     *     2/2000

* cited by examiner

*Primary Examiner*—Ngoc Vu
(74) *Attorney, Agent, or Firm*—Joseph J. Laks; Robert B. Levy; Joseph J. Kolodka

(57) ABSTRACT

A wireless communications system comprises a first splitter separating at least two signals, a wireless circuit for processing a first signal as a wireless signal and a combiner connected to the wireless circuit and the splitter, combining the two signals and transmitting the signals into a service area. The wireless communications system further comprises a second splitter separating the wireless signal from a second signal, and a transmitter for broadcasting the wireless signal.

22 Claims, 2 Drawing Sheets

SYSTEM AND METHOD FOR VOICE/DATA TRANSMISSION OVER CABLE NETWORKS

BACKGROUND OF THE INVENTION

1. Field of the Invention

The present invention relates to voice/data transmission, and more particularly to a method for providing voice/data transmission over cable networks.

2. Discussion of Related Art

As cable operators switch the existing analog cable systems over to two-way capable digital systems additional types of content can be carried. Other benefits include an increased number of available channels and improved video quality. The two-way capable digital systems have been implemented with proprietary or DOCSIS (Data Over Cable Service Interface Specification) cable modems. The need for the delivery of voice services to the home over the digital cable system has been established.

For both the video service and the high-speed data service, the end device has been inside the home, e.g., digital cable set top box or digital cable modem. However, for voice services, it is more traditional to have the digital termination device outside the home. This is the usual practice of the phone companies, which use a Network Interface Device "NID" on the side of a home or other building. One difficulty with the NID outside of the home is integrating a wireless capability because of the low transmit power of the available wireless bands.

Therefore, a need exists for a method of providing voice/data transmission over cable networks.

SUMMARY OF THE INVENTION

A wireless communications system comprises a first splitter separating at least two signals, a wireless circuit for processing a first signal as a wireless signal and a combiner connected to the wireless circuit and the splitter, combining the two signals and transmitting the signals into a service area. The wireless communications system further comprises a second splitter separating the wireless signal from a second signal, and a transmitter for broadcasting the wireless signal.

BRIEF DESCRIPTION OF THE DRAWINGS

Preferred embodiments of the present invention will be described below in more detail, with reference to the accompanying drawings.

DETAILED DESCRIPTION

Figure 1:
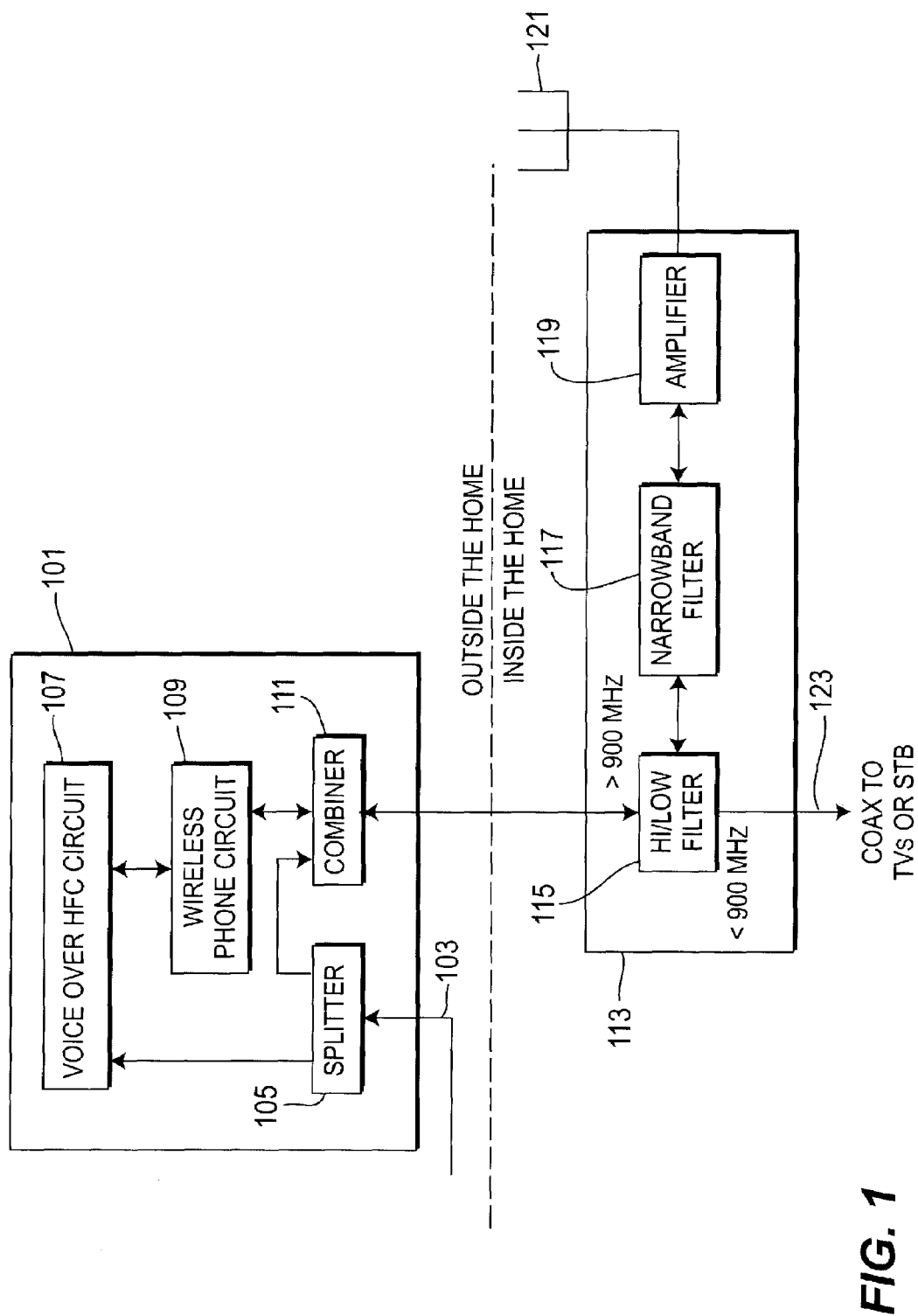
FIG. 1 is a diagram of a system for providing voice/data transmission over cable networks according to an embodiment of the present invention.

According to an embodiment of the present invention, a system and method provides for voice/data transmission over cable networks. It should be noted that throughout the Detailed Description, the terms voice and data are used interchangeably.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

One difficulty with an NID outside of the home is integrating a wireless capability for either the voice or the data services. This is because the transmit power allowed by the current unlicensed wireless bands, e.g., 900 MHz, 2.4 GHz, and 5 GHz, is not enough to effectively penetrate an exterior wall of the home.

According to an embodiment of the present invention, the wireless data can be passed over an existing coax into the home and splitting the wireless data off once inside the home. Existing video services do not go above approximately 860 MHz in most cases. Thus, data from the unlicensed bands can be placed on the same cable as video services and split off once inside the home. Once inside the home the wireless voice or data signal can be separated from the video signal, amplified and transmitted via antenna. In addition, power for the amplifier can be sent as a DC supply over the coaxial cable or it can be powered by a standard AC/DC power supply.

An advantage of using a wireless system for the telephone/cable operator is the reduced amount of wiring needed inside the home. With a wireless phone system, the operator does not need to rewire the twisted pair wiring inside the home.

Most currently installed coax cable does not effectively transmit frequencies above 900 MHz very well. However, in most cases the wireless band extraction circuit will be close to the entry point of the coaxial cable. It is expected that the length of coaxial transmission will be short enough, e.g., less than 15 feet, that the coaxial cable losses will not be very large even at high frequencies.

Referring to FIG. 1, a signal arrives at an interface 101 via a cable 103. A splitter 105 receives the signal and separates a voice portion from a video portion. A voice over HFC (Hybrid/Fiber optic Coaxial) circuit 107 processes the voice portion of the signal. A wireless phone circuit 109 can be connected to the voice over HFC circuit 107. The wireless phone circuit 109 converts the voice portion to a wireless signal, for example, a wireless signal having a desired frequency. The wireless phone circuit 109 can be replaced or augmented with another wireless circuit, such as an 802.11B wireless data circuit, or any other suitable wireless communications device. Thus, the system can support wireless voice and/or data services. Wireless data can be combined with a television signals at a combiner 111. A coaxial cable can be connected to a wireless transmitter 113. The wireless transmitter comprises a hi/low filter 115 for separating the television signal from the wireless data. The television signal can be sent to a television. The wireless data signal can be passed through a narrowband filter 117 and an amplifier before be broadcast by an antenna 121.

Figure 2:
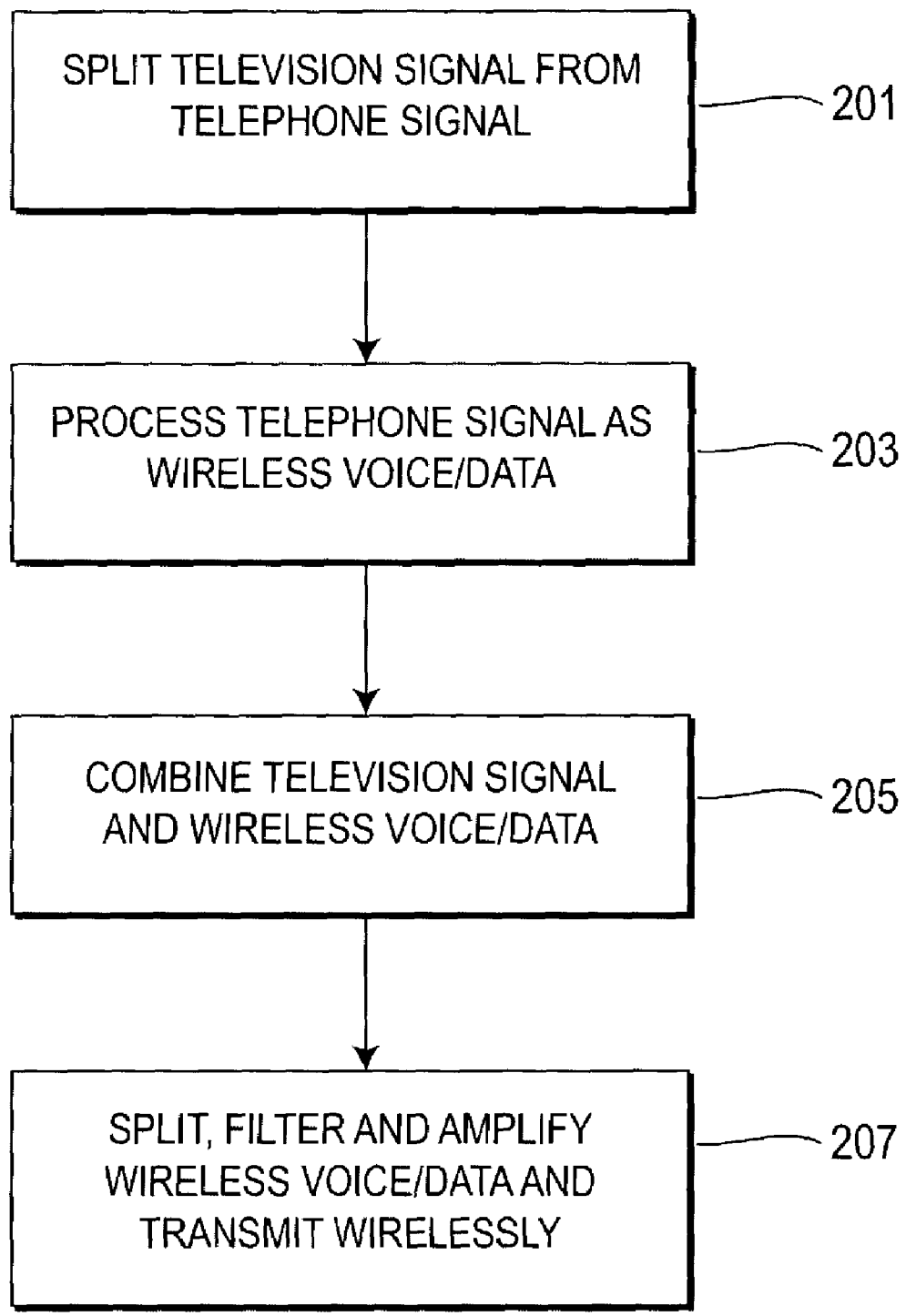
FIG. 2 is a flow chart of a method for providing voice/data transmission over a cable network according to an embodiment of the present invention.

Referring to FIG. 2, the signal can be split into telephone and television portions 201. The telephone portion can be processed as a wireless voice and/or data signal 203. The wireless signal is combined with the television signal and the combined signal enters a building or service area 205. The wireless signal can be split from the television signal, filtered and amplified before being transmitted 207. Thus, a voice over HFC signal can be transmitted wirelessly inside a service area (e.g., a business).

The wireless data can be transmitted on various channels to improve quality and security. The wireless data can also be encrypted prior to wireless transmission, for example, by the wireless phone circuit 109. A receiver, e.g., a telephone, can decrypt the wireless signal to prove secure service.

Having described embodiments for a method for providing a status to a mobile device, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A communications system comprising:
    a first splitter separating a first signal from a second signal, the first signal being a voice signal;
    a wireless circuit coupled to the first splitter for converting the first signal to a wireless signal;
    a combiner coupled to the wireless circuit and the splitter for combining the wireless signal and the second signal into a combined signal and transmitting the combined signal into a service area via a wired connection;
    a second splitter coupled to the combiner separating the wireless signal from the second signal; and
    a wireless transmitter coupled to the second splitter for wirelessly broadcasting the wireless signal,
    wherein the first splitter, the wireless circuit, the combiner, the second splitter, and the wireless transmitter are all disposed at a location of final consumption of the wireless signal and the second signal.

2. The system of claim 1, wherein the wireless circuit comprises:
    a voice over cable circuit, wherein the voice over cable circuit preprocesses the first signal; and
    a wireless data circuit converts the first signal into the wireless signal.

3. The system of claim 1, wherein the second splitter comprises a hi/low filter.

4. The system of claim 1, wherein the transmitter comprises:
    a narrowband filter coupled to the second splitter;
    an amplifier receiving the wireless signal from the second splitter; and
    an antenna, coupled to the amplifier, for broadcasting the wireless signal.

5. The system of claim 1, wherein the second signal is a television signal.

6. The system of claim 1, wherein the first signal exists above about 900 MHz and the second signal exists below about 900 MHz.

7. The system of claim 1, wherein the first splitter, the wireless circuit, and the combiner are operatively disposed at an external portion of the location of final consumption, and the second splitter and the wireless transmitter are operatively disposed at an internal portion of the location of final consumption.

8. The system of claim 1, wherein the first splitter, the wireless circuit, and the combiner are comprised in a network interface device (NID).

9. The system of claim 1, wherein said first splitter receives the first signal that is separated from the second signal via a cable.

10. A method of data transmission comprising the steps of:
    splitting a signal into a first signal portion and a second signal portion, the first signal portion being a voice portion;
    processing and converting the first signal portion to a wireless data signal;
    combining the wireless data signal with the second signal portion into a combined signal;
    transmitting the combined signal through a wired media;
    splitting the wireless data signal from the second signal portion from the combined signal; and
    broadcasting, wirelessly, the wireless data signal,
    wherein both of said splitting steps, said processing and converting, said combining, said transmitting, and said broadcasting steps are all performed at a location of final consumption of the wireless data signal and the second signal portion.

11. The method of claim 10, wherein the second signal portion is a television signal.

12. The method of claim 10, further comprising the steps of:
    filtering the wireless data signal; and
    amplifying the wireless data signal before broadcast.

13. The method of claim 10, wherein said first splitting, said processing and converting, and said combining steps are all performed at an external portion of the location of final consumption, and said transmitting, said second splitting, and said broadcasting steps are all performed at an internal portion of the location of final consumption of the wireless data signal and the second signal portion.

14. The method of claim 10, wherein said first splitting, said processing and converting, and said combining steps are all performed within a network interface device (NID).

15. The method of claim 10, further comprising the step of initially receiving the signal that is split into the first signal portion and the second signal portion via a cable.

16. A communications system comprising
    means for splitting a two-way digital cable signal into at least a first signal portion and a second signal portion, the first signal portion being a voice portion;
    means for processing and converting the first signal portion to a wireless data signal;
    means for combining the wireless data signal with the second signal portion into a combined signal;
    means for transmitting the combined signal through a coaxial cable;

means for splitting the wireless data signal from the second signal portion in the combined signal; and means for broadcasting, wirelessly, the wireless data signal, wherein said means for splitting the two-way digital cable signal, said means for processing and converting, said means for combining, said means for transmitting, said means for splitting the wireless data signal from the second signal portion, and said means for broadcasting are all disposed at a location of final consumption of the wireless data signal and the second signal portion.

17. The system of claim 16, wherein the means for splitting the wireless data signal from the second signal portion in the combined signal comprises a hi/low filter.

18. The system of claim 17, wherein the hi/low filter splits the first signal portion, existing above about 900 MHz, from the second signal portion, existing below about 900 MHz.

19. The system of claim 16, wherein the means for processing the first signal portion comprises:

a voice over cable circuit, wherein the voice over cable circuit preprocesses the first signal portion; and a wireless data circuit converts the first signal portion into the wireless data signal.

20. The system of claim 16, wherein means for broadcasting comprises:

a narrowband filter connected to the second splitter;

an amplifier receiving the wireless signal from the second splitter; and an antenna, coupled to the amplifier, for broadcasting the wireless signal.

21. The system of claim 16, wherein said means for splitting the two-way digital cable signal, said means for processing and converting, and said means for combining are operatively disposed at an external portion of the location of final consumption, and said means for transmitting, said means for splitting the wireless data signal from the second signal portion, and said means for broadcasting are operatively disposed at an internal portion of the location of final consumption.

22. The system of claim 16, wherein said means for splitting the two-way digital cable signal, said means for processing and converting, and said means for combining are comprised in a network interface device (NID).

* * * * *